(12) United States Patent
Gimblet et al.

(10) Patent No.: US 6,400,873 B1
(45) Date of Patent: Jun. 4, 2002

(54) FIBER OPTIC CABLE HAVING A STRENGTH MEMBER

(75) Inventors: Michael J. Gimblet; William S. Jackman, both of Hickory; Alan T. Parsons, Newton, all of NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/540,427

(22) Filed: Mar. 31, 2000

(51) Int. Cl.$^7$ .................................................. G02B 6/44

(52) U.S. Cl. .................. 385/102; 385/100; 385/103; 385/101

(58) Field of Search ................................ 385/100, 101, 385/102, 103, 107, 113, 109

(56) References Cited

U.S. PATENT DOCUMENTS

| | | | |
|---|---|---|---|
| 4,037,922 A | 7/1977 | Claypoole | 385/103 X |
| 4,169,657 A | 10/1979 | Bedard | 264/1 X |
| 4,458,986 A | 7/1984 | Yuto et al. | 385/141 |
| 4,467,138 A | 8/1984 | Brorein | 174/115 |
| 4,575,188 A | 3/1986 | Ueba | 385/141 |
| 4,579,420 A * | 4/1986 | Winter et al. | 385/100 X |
| 4,659,174 A | 4/1987 | Ditscheid et al. | 385/100 X |
| 4,725,453 A | 2/1988 | Nakasone et al. | 427/163 |

(List continued on next page.)

FOREIGN PATENT DOCUMENTS

| | | | |
|---|---|---|---|
| DE | 3319370 A1 | 5/1983 | 385/100 X |
| DE | 4020853 A1 | 6/1990 | 385/100 X |
| DE | 4337997 A1 | 11/1993 | 385/100 X |
| EP | 0 126 509 A2 | 5/1873 | 385/100 X |
| EP | 0 126 509 A3 | 5/1983 | 385/100 X |
| EP | 0 126 428 A2 | 11/1984 | 385/100 X |
| EP | 0 129 372 A2 | 12/1984 | 385/100 X |
| EP | 0 129 372 A3 | 12/1984 | 385/100 X |
| EP | 0 349 312 A3 | 1/1990 | 385/100 X |
| EP | 0 349 312 B1 | 1/1990 | 385/100 X |
| EP | 0 349 312 A2 | 1/1990 | 385/100 X |
| EP | 0 126 509 B1 | 8/1990 | 385/100 X |
| EP | 0 473 350 A3 | 4/1992 | 385/102 X |
| EP | 0 473 350 A2 | 4/1992 | 385/100 X |
| EP | 0702255 A1 | 3/1996 | 385/100 X |
| FR | 2 331 800 | 11/1975 | 385/103 X |
| FR | 2492990 | 10/1981 | 385/100 X |
| FR | 2 509 872 | 7/1982 | 385/100 X |
| FR | 2 728 694 | 12/1994 | 385/100 X |
| GB | 2 242 035 A | 9/1991 | 385/100 X |
| WO | 94/02871 | 2/1994 | 385/103 X |

OTHER PUBLICATIONS

Andrews Fiber Optic Products, Product Information, "Mechanical Characteristics—Ruggedized Microcable Tether Cable", 1998.

*Primary Examiner*—Brian Healy
(74) *Attorney, Agent, or Firm*—Timothy J. Aberle

(57) ABSTRACT

A fiber optic cable including at least one optical fiber and a strength member surrounding the optical fiber. The strength member can include a plurality of fibers disposed in a matrix such that the resulting strength member preferably has a modulus of elasticity of at least about 20 GPa and, more preferably, at least about 40 GPa. While the strength member can be an integral member, the strength member can be formed of at least two physically distinct portions in order to more precisely tailor the characteristics of the fiber optic cable. In this regard, the strength member can include a first strength member surrounding the optical fiber that includes a first matrix and a plurality of first fibers embedded within the first matrix, and a second strength member surrounding the first strength member that includes a second matrix and a plurality of second fibers embedded within the second matrix. The fiber optic cable can also include a release layer disposed between the optical fiber and the strength member to facilitate separation of the strength member from the optical fiber.

35 Claims, 2 Drawing Sheets

U.S. PATENT DOCUMENTS

| | | | |
|---|---|---|---|
| 4,729,628 A | 3/1988 | Kraft et al. | 385/100 X |
| 4,776,664 A | 10/1988 | Okura | 385/100 X |
| 4,781,432 A | 11/1988 | Zonger et al. | 385/103 X |
| 4,790,623 A * | 12/1988 | Winter et al. | 385/100 X |
| 4,795,234 A | 1/1989 | Nakasone et al. | 385/102 X |
| 4,828,359 A | 5/1989 | Ueba et al. | 385/123 |
| 4,838,635 A | 6/1989 | Oestreich | 385/100 X |
| 4,859,025 A | 8/1989 | Houghton | 385/100 X |
| 4,895,426 A | 1/1990 | Pinson | 385/103 X |
| 5,039,195 A * | 8/1991 | Jenkins et al. | 385/101 |
| 5,115,485 A | 5/1992 | Gandy | 385/101 |
| 5,155,304 A | 10/1992 | Gossett et al. | 174/117 R |
| 5,195,158 A * | 3/1993 | Bottoms, Jr. et al. | 385/105 |
| 5,204,926 A * | 4/1993 | Bottoms, Jr. et al. | 385/105 |
| 5,259,055 A | 11/1993 | Cowen et al. | 385/100 |
| 5,333,229 A | 7/1994 | Sayegh | 385/102 |
| 6,067,394 A | 5/2000 | Ruello et al. | 385/106 |

\* cited by examiner

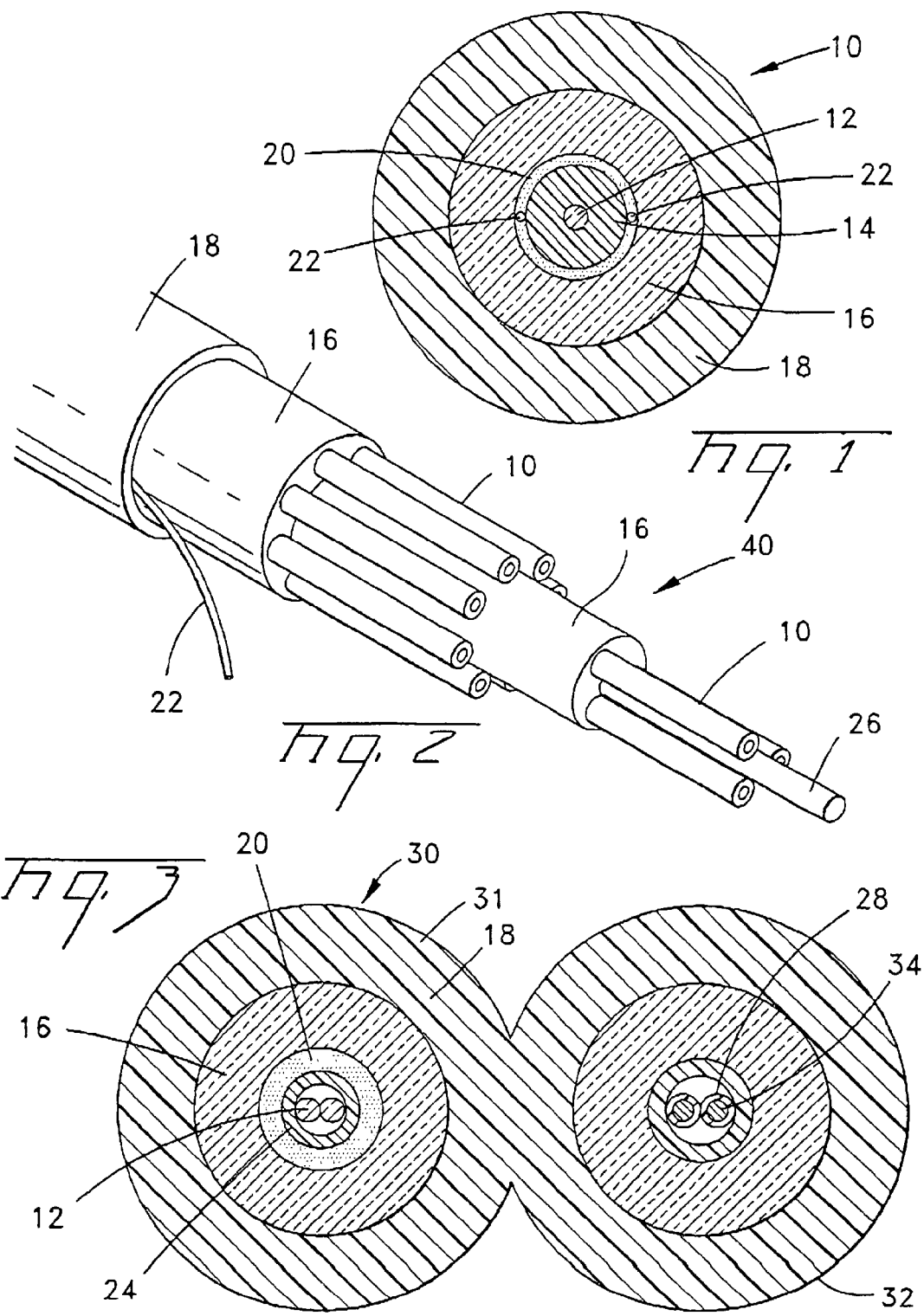

FIBER OPTIC CABLE HAVING A STRENGTH MEMBER

FIELD OF THE INVENTION

The present invention relates generally to fiber optic cables and, more particularly, to fiber optic cables having at least one strength member.

BACKGROUND OF THE INVENTION

Fiber optic cables have traditionally served as trunk cables for transmitting voice and data over relatively long distances. Since optical fibers transmit voice and data with relatively low losses and at high speed in comparison to transmission via electrical cables, fiber optic cables continue to be a preferred choice for trunk cables. For at least the same reasons, an increasing emphasis is also being placed upon extending fiber optic cables to the home or business. Thus, in addition to fiber optic cables serving as trunk cables for the transmission of voice and data over relatively long distances, fiber optic cables have been designed as drop cables for transmission of voice and data directly to the home or business.

Traditionally, coaxial or other electrical cables have served as drop cables. Thus, signals that were transmitted across a fiber optic trunk cable would be converted into corresponding electrical signals and delivered to the home via an electrical drop cable. As will be apparent, the conversion between optical and electrical signals not only introduces at least some loss, but also requires a converter, thereby increasing the overall cost of the communication system.

SUMMARY OF THE INVENTION

In view of the foregoing, a fiber optic cable according to one aspect of the present invention includes at least one optical fiber, a strength member that surrounds the at least one optical fiber, and a jacket surrounding the strength member, wherein the strength member has a modulus of elasticity of about 20 GPa and, more preferably, a modulus of elasticity of at least 40 GPa. According to another aspect of the present invention, a fiber optic cable includes at least one optical fiber, a strength member that surrounds the at least one optical fiber, and a release layer disposed between the at least one optical fiber and the strength member to facilitate separation of the strength member from the at least one optical fiber. According to either aspect of the present invention, the fiber optic cable can be designed to be self-supporting since the strength member provides substantial tensile strength. The fiber optic cable of either aspect of the present invention can therefore be utilized in a variety of applications, including use as an aerially installed, self-supporting fiber optic drop cable.

According to another aspect of the present invention, a fiber optic cable is provided that includes at least one optical fiber, a first strength member at least partially surrounding the at least one optical fiber and a second strength member at least partially surrounding the first strength member, wherein the first and second strength members are physically distinct from one another. According to this aspect of the present invention, one or both of the first and second strength members are formed of a matrix and a plurality of fibers disposed within the matrix. However, the characteristics of the fiber optic cable can be tailored to meet the requirements of various applications since the first and second strength members can include either the same type or different types of fibers depending upon the desired characteristics of the resulting fiber optic cable. The fiber optic cable of this aspect of the present invention can therefore be designed to support relatively large tensile forces, such that the fiber optic cable can be self-supporting.

BRIEF DESCRIPTION OF THE DRAWINGS

FIG. 1 is a cross-sectional view of a fiber optic cable according to one embodiment of the present invention.

FIG. 2 is fragmentary perspective view of a fiber optic cable according to another embodiment of the present invention.

FIG. 3 is a cross-sectional view of a fiber optic cable according to a further embodiment of the present invention.

DETAILED DESCRIPTION OF THE INVENTION

Figure 4:
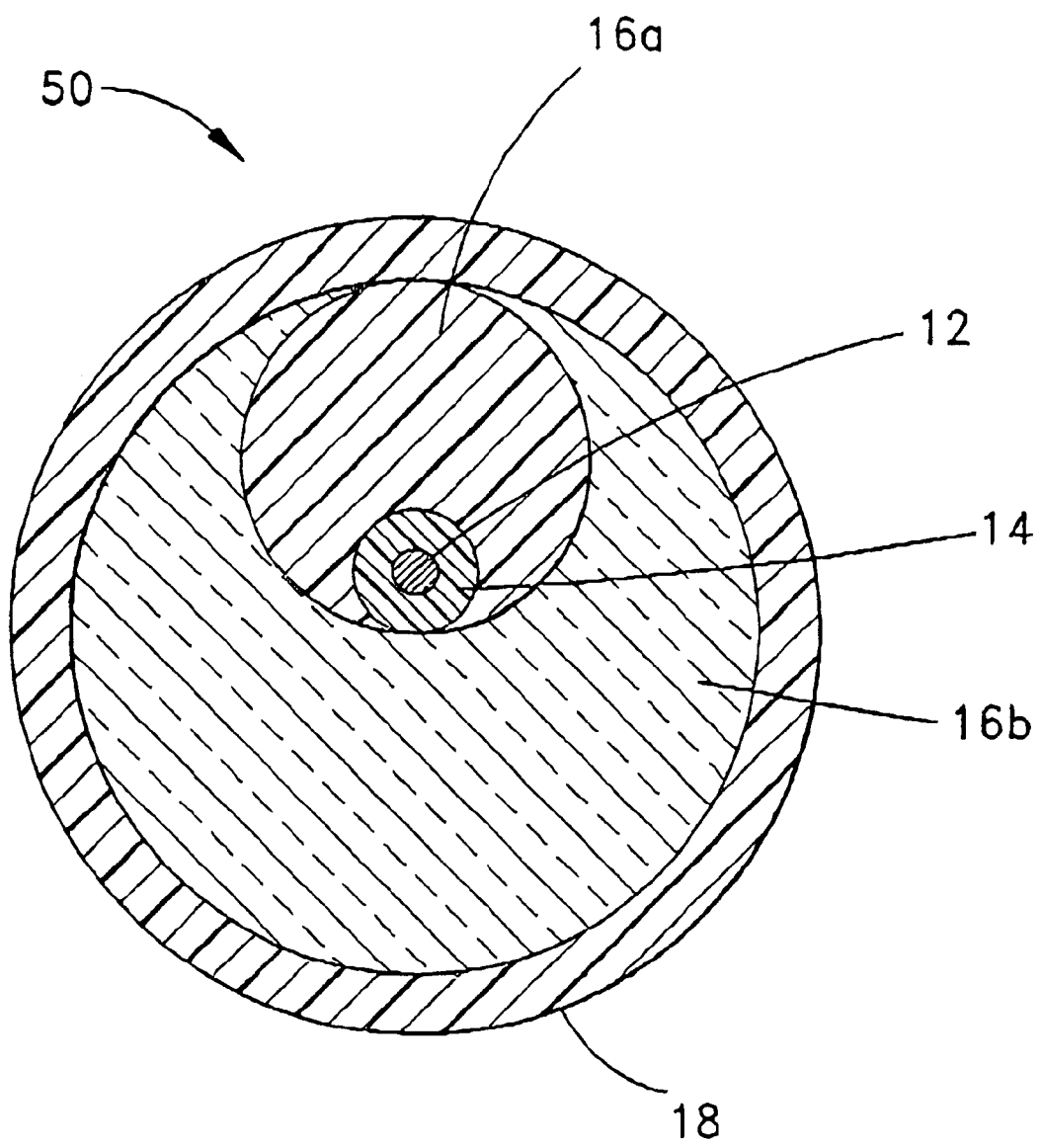
FIG. 4 is a cross-sectional view of a fiber optic cable according to yet another embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, fiber optic cable 10 according to one aspect of the present invention is illustrated. Although fiber optic cable 10 can be designed for many different applications, fiber optic cable 10 can be designed to be self-supporting. Fiber optic cable 10 can therefore be aerially installed, for example, between a utility pole and a building. Moreover, fiber optic cable 10 can be designed to be relatively small and inexpensive relative to conventional fiber optic trunk cables.

Fiber optic cable 10 includes at least one optical fiber 12. A typical optical fiber includes a silica-based core that is operative to transmit light and is surrounded by a silica-based cladding having a lower index of refraction than the core. A soft primary coating surrounds the cladding and a relatively rigid secondary coating surrounds the primary coating. Optical fibers can be, for example, single mode or multi-mode optical fibers made commercially available by Corning, Inc. Although, optical fiber 12 can have various diameters, optical fiber 12 of one embodiment has a diameter of about 250 microns.

Additionally, optical fiber 12 can be either tightly or loosely buffered, or not buffered at all. In the embodiment of FIG. 1, optical fiber 12 is tightly buffered with a protective buffer layer 14. Buffer layer 14 can formed of various materials including polyvinyl chloride (PVC), ultraviolet (UV) curable acrylate or the like. While buffer layer 14 can have various diameters, fiber optic cable 10 of one embodiment includes an optical fiber having a diameter of about 250 microns and a buffer layer having a diameter of about 900 microns . Although fiber optic cable 10 of the embodiment of FIG. 1 preferably includes a single, tightly buffered optical fiber, fiber optic cable 20 can alternatively include a plurality of loosely buffered optical fibers as described hereinbelow in conjunction with the embodiment of FIG. 3. In this regard, while the plurality of optical fibers can be a plurality of individual optical fibers, the plurality of optical fibers can be arranged in one or more optical ribbons.

According to a preferred embodiment of the present invention, fiber optic cable 10 includes a strength member 16 surrounding at least one optical fiber 12. In the preferred embodiment, strength member 16 includes a matrix and a plurality of fibers disposed within the matrix. Both the matrix and the fibers can be formed of various materials depending upon the desired characteristics of strength member 16 and, in turn, fiber optic cable 10. The desired characteristics of strength member 16 can include, but are not limited to, the modulus of elasticity, i.e., Young's Modulus, tensile strength, and coefficient of thermal expansion. For example, the matrix can be formed of a thermoset material, such as polyester, an epoxy, vinyl ester or a modified acrylic, such as urethane acrylate. Alternatively, the matrix can be formed of an elastomeric material, such as urethane, or a thermoplastic material, such as a polyolefin. In addition, the fibers can be formed of glass fibers, aramid fibers, polycarbonate fibers or strands of liquid crystal polymer, or other materials with desired properties. In a preferred embodiment, strength member 16 can be a glass reinforced GRP member, or an aramid reinforced ARP member. The matrix material for an ARP or GRP is preferably a thermoset material; however, thermoplastics can be used as well.

While strength member 16 can include a single type of fiber embedded within the matrix, strength member 16 can include different types of fibers, such as a combination of glass and aramid fibers, embedded within the matrix in order to further tailor the characteristics of strength member 16 and, in turn, fiber optic cable 10. While strength member 16 can be segregated into discrete portions with each portion of strength member 16 including a different type or a different percentage of fibers embedded within the matrix as depicted in FIG. 4, strength member 16 can include different types of fibers intermixed within the matrix such that strength member 16 is homogenous.

Fiber optic cable 10 also preferably includes a protective jacket 18 surrounding strength member 16. While protective jacket 18 can be formed of various materials, protective jacket 18 is preferably formed of a plastic material, such as PVC. Like buffer layer 14, strength member 16 and protective jacket 18 can be formed to have various dimensions, typically various diameters, depending upon the application for which fiber optic cable 10 is designed. In one embodiment, for example, strength member 16 has a diameter of 2.0 millimeters and protective jacket 18 has a diameter of 3.0 millimeters.

Fiber optic cable 10 can be employed in various applications. In particular, strength member 16 can be designed to have a relatively large modulus of elasticity and a correspondingly large tensile strength. In this regard, strength member 16 can be designed such that fiber optic cable 10 has a modulus of elasticity of between about 20 to about 70 GPa. Preferably, strength member 16 is designed such that the resulting fiber optic cable 10 has a modulus of elasticity of between about 35 and 60 GPa and, more preferably, between about 40 and 50 GPa. As such, fiber optic cable 10 of this embodiment can support a tensile load of at least about 300 pounds. Accordingly, fiber optic cable 10 can be aerially installed and can be self-supporting across spans of 200 feet or more, even under heavy ice and wind conditions as defined by the NESC.

As depicted in FIG. 1, fiber optic cable 10 can include a release layer 20 surrounding optical fiber 12 and a disposed between optical fiber 12 and strength member 16. In particular, release layer 20 preferably surrounds buffer layer 14. Release layer 20 is designed to facilitate separation of strength member 16 from optical fiber 12 since release layer 20 prevents strength member 16 from adhering to the buffered optical fiber. As such, protective jacket 18 and strength member 16 can be removed or stripped from optical fiber 12 in order to access optical fiber 12, such as in the course of connectorization. While release layer 20 can be formed of various materials, release layer 20 is typically formed of a UV curable acrylate, a silicone gel or a layer of yarns, e.g., strength yarns. Fiber optic cable 10 can also include a water swellable material, such as a super absorbent polymer in the form of a powder, water swellable yarns and/or water swellable tapes, to inhibit migration of water. In order to further facilitate the removal of protective jacket 18 and strength member 16, fiber optic cable 10 can include one or more rip cords 22.

Fiber optic cable 10 can be formed in various shapes. Typically, fiber optic cable 10 has a circular cross-sectional shape as depicted in FIG. 1. As such, strength member 16 also typically has a circular cross-sectional shape. However, fiber optic cable 10 can have a strength member 16 that has a non-circular shape, such as an elliptical or oval shape. By including a strength member 16 having a non-circular shape, the resulting fiber optic cable will generally no longer bend uniformly in each direction, but will have an axis or direction along which fiber optic cable 10 will preferentially bend. For a fiber optic cable that includes an elliptical strength member 16 defining a major axis and an orthogonal minor axis, on resulting fiber optic cable will preferentially bend about the major axis.

While one embodiment of fiber optic cable 10 is depicted in FIG. 1, fiber optic cable 10 can be embodied in many different configurations depending upon the intended application. In one embodiment, for example, fiber optic cable 10 includes not just a single optical fiber 12, but a plurality of optical fibers 12. In this embodiment, fiber optic cable 10 can include a plurality of optical fibers 12 loosely buffered within a buffer tube 24. While buffer tube 24 can be formed of various materials, buffer tube 24 is typically formed of a plastic material, such as PVC or the like. While fiber optic cable 10 of this embodiment can include a single, centrally located buffer tube 24 as depicted in conjunction with the embodiment of FIG. 3, fiber optic cable 10 can include a plurality of buffer tubes 24, each of which houses one or more optical fibers 12.

As depicted in FIG. 2, fiber optic cable 40 of one embodiment defines a longitudinal axis and can include a plurality of fiber optic cables 10. Although not necessary for the practice of the present invention, fiber optic cable 40 of this embodiment can also include a central strength member 26, typically formed for GRP, ARP or the like. As such, fiber optic cables 10 can be disposed circumferentially about central strength member 26. As depicted in FIG. 2, fiber optic cable 40 also includes strength members 16, preferably formed of a plurality of loose aramid fibers. Fiber optic cable 40 also preferably includes a protective jacket 18 surrounding the outermost strength members 16 and may optionally include one or more rip cords 22.

The present invention can be practiced in the form of a composite cable 30 having electrical conductors 28 in addition to optical fibers 12. As shown in FIG. 3, for example, composite cable 30 can include a fiber optic portion 31 and an electrical portion 32. Fiber optic portion 31 includes at least one optical fiber 12 and, in the illustrated embodiment, a pair of optical fibers. While optical fibers 12 can be tightly buffered as depicted and described in conjunction with the embodiment of FIG. 1, fiber optic portion 31 of the cable of FIG. 3 includes a buffer tube 24 in which the optical fibers are loosely disposed. Fiber optic portion 31 also includes strength member 16. In addition, fiber optic portion 31 includes protective jacket 18 which surrounds strength member 16. As described above, fiber optic portion 31 of the cable can also include a release layer 20 disposed between strength member 16 and buffer tube 24 in order to facilitate separation of protective jacket 18 and strength member 16 from buffer tube 24.

As depicted in FIG. 3, electrical portion 32 of composite cable 30 includes at least one and, more typically, a plurality of electrical conductors 28. In instances in which electrical portion 32 includes a plurality of electrical conductors, each electrical conductor is preferably coated with an insulating layer 34 in order to maintain electrical isolation between the conductors. Electrical portion 32 can also include a buffer tube 24 through which the electrical conductors 28 extend. Like fiber optic portion 31 of composite cable 30, electrical portion 32 also includes a strength member 16 surrounding buffer tube 24 and a protective jacket 18 surrounding strength member 16

As indicated above, strength member 16 of fiber optic cable 10 of the present invention need not be homogenous. Instead, strength member 16 can include different portions that are each constructed of different materials or of different amounts or percentages of the same materials. For example, fiber optic cable 10 can include a strength member having a first portion having a first type of fiber, such as glass fibers, embedded within a matrix, and a second portion having a second type of fibers, such as aramid fibers, embedded within a matrix. Alternatively, strength member 16 can have first and second portions that each include the same type of fibers embedded within a matrix, albeit with the first portion of strength member 16 including a greater amount or percentage of fibers embedded within the matrix than the second portion of strength member 16. The characteristics of fiber optic cables according to the present invention, such as the modulus of elasticity, the tensile strength and the coefficient of thermal expansion, can be more specifically tailored to an intended application.

In one embodiment depicted in FIG. 4, fiber optic cable 50 includes, for example, a tightly buffered optical fiber 12 at least partially embedded within a first strength member 16a. Optical fiber ribbons and non-buffered fibers can be used as well. First strength member 16a can, in turn, be at least partially embedded within a second strength member 16b which, in turn, may be surrounded by protective jacket 18. According to this embodiment, both of the first and second strength members 16a,16b can be GRP, alternatively, members 16a,16b can be formed of different materials, e.g., member 16a can be ARP.

Fiber optic cable 50 of this embodiment is preferably constructed such that first and second strength members 16a,16b are physically distinct. In this regard, first and second strength members 16a,16b can be adhered, attached or otherwise coupled to one another so long as first and second strength members 16a,16b remain separate and distinct portions of the resulting fiber optic cable. In one embodiment, for example, first and second strength members 16a,16b are formed as slotted rods. As such, buffered optical fiber 12 can be inserted into the slot defined by the rod-like first strength member 16a. Similarly, the combination of the first strength member and the buffered optical fiber can be inserted into the slot defined by the rod-like second strength member 16b prior to surrounding the second strength member with protective jacket 18, typically formed of PVC or the like.

Fiber optic cables 10,30,50 of the present invention can be fabricated in a variety of manners. In one embodiment, fiber optic cable 10 is fabricated by initially drawing buffered optical fiber 12 and a plurality of fibers from respective pay-offs, reels or the like. According to the present invention, the fibers can extend parallel to optical fiber 12 in a lengthwise direction through the matrix. Alternatively, the fibers can be stranded about optical fiber 12, such as in a helical or SZ pattern lay. According to one embodiment in which strength member 16 is pultruded or extrusion formed, the buffered optical fiber and the plurality of fibers are passed through a matrix material so as to impregnate the fibers with the matrix material. The buffered optical fiber and the wet fibers are then typically drawn through a die that defines the exterior shape of the resulting strength member, such as the circular shape depicted in FIG. 1. Although not necessary to the practice of the present invention, optical fiber 12 and the wet fibers can be drawn through a fiber feed card system or the like before entering the die in order to remove excess matrix material and to preform the wet fibers into a shape that approximates the eventual exterior shape of strength member 16. After strength member 16 has been drawn through the die and been cured, such as by exposure to UV light, heating or other known curing methods, protective jacket 18 is preferably extruded about strength member 16 to form the resulting fiber optic cable.

The buffered optical fiber 12 can initially be coated with a release layer 20 prior to being drawn through the matrix material. For example, a release layer of UV curable acrylate can be provided by pulling the buffered optical fiber through an acrylate and thereafter curing the acrylate by exposure to UV light. In addition, rip cords 22 can be extended in a longitudinal direction adjacent to strength member 16. Further, coatings such as a thermoplastic material, ethylene-acrylic acid (EAA), ethylene-vinyl acetate (EVA) or rubber, can be applied to the matrix material. As known to those skilled in the art, these coatings will cause the inner surface of strength member 16, i.e., that surface proximate release layer 20 or buffer layer 14, to be relatively smooth.

Regardless of the manner in which fiber optic cable 10 is fabricated, the resulting fiber optic cable preferably has a relatively large modulus of elasticity and a correspondingly large tensile strength. For example, fiber optic cable 10 typically has a modulus of elasticity of a least 20 GPa and, more preferably, a modulus of elasticity of at least 40 GPa. In addition, fiber optic cable 10 also preferably has a tensile strength of at least 300 pounds. As such, fiber optic cable 10 of the present invention can be self-supporting for spans of 200 feet or more, even when faced with heavy wind and ice loading conditions as set forth by the NESC. Furthermore, fiber optic cable 10 can be relatively small and inexpensive.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic cable comprising:
   at least one optical fiber;
   a strength member surrounding said at least one optical fiber, said strength member having a modulus of elasticity of at least about 20 GPa; and
   a jacket surrounding said strength member.

2. A fiber optic cable according to claim 1 wherein said strength member has a modulus of elasticity of at least about 40 GPa.

3. A fiber optic cable according to claim 1 wherein the matrix of said strength member is selected from the group consisting of thermoset materials, elastomeric materials and thermoplastic materials.

4. A fiber optic cable according to claim 1 wherein said strength member comprises fibers, the fibers of said strength member are selected from the group consisting of glass fibers, aramid fibers, polycarbonate fibers and strands of liquid crystal polymer.

5. A fiber optic cable according to claim 1 wherein said strength member comprises fibers, the fibers of said strength member are comprised of a plurality of first and second fibers formed of first and second materials, respectively.

6. A fiber optic cable according to claim 1 further comprising a release layer disposed between said at least one optical fiber and said strength member to facilitate separation of said strength member from said at least one optical fiber.

7. A fiber optic cable according to claim 6 wherein said release layer is selected from the group consisting of acrylate, a layer of yarns and silicone.

8. A fiber optic cable according to claim 6 wherein said release layer comprises a water swellable material.

9. A fiber optic cable according to claim 1 further comprising a buffer layer tightly surrounding said at least one optical fiber, said buffer layer being surrounded by said strength member.

10. A fiber optic cable according to claim 1 further comprising a buffer tube loosely surrounding said at least one optical fiber, said buffer tube being surrounded by said strength member.

11. A fiber optic cable according to claim 1 further comprising at least one ripcord.

12. A fiber optic cable according to claim 1 wherein said at least one optical fiber extends in a longitudinal direction, and wherein said strength member defines major and minor axes such that the fiber optic cable preferentially bends about the major axis.

13. A fiber optic cable according to claim 1 that defines a longitudinal axis, comprising a plurality of optical fibers.

14. A fiber optic cable according to claim 13 wherein said plurality of optical fibers are disposed in a common buffer tube.

15. A fiber optic cable according to claim 13 said fibers being loosely buffered.

16. A fiber optic cable according to claim 1 further comprising at least one electrical conductor.

17. A fiber optic cable according to claim 16 further comprising a second strength member surrounding said at least one electrical conductor.

18. A fiber optic cable according to claim 17 further comprising a buffer tube through which said at least one electrical conductor extends.

19. A fiber optic cable comprising:
    at least one optical fiber;
    a strength member surrounding said at least one optical fiber; and
    a release layer disposed between said at least one optical fiber and said strength member to facilitate separation of said strength member from said at least one optical fiber.

20. A fiber optic cable according to claim 19 wherein said release layer is selected from the group consisting of acrylate, a layer of yarns and silicone.

21. A fiber optic cable according to claim 19 wherein said release layer comprises a water swellable material.

22. A fiber optic cable according to claim 19 wherein said strength member has a modulus of elasticity of at least about 20 GPa.

23. A fiber optic cable according to claim 19 wherein the matrix of said strength member is selected from the group consisting of thermoset materials, elastomeric materials and thermoplastic materials.

24. A fiber optic cable according to claim 19 wherein said strength member comprises fibers, the fibers of said strength member are selected from the group consisting of glass fibers, aramid fibers, polycarbonate fibers and strands of liquid crystal polymer.

25. A fiber optic cable according to claim 19 wherein said strength member comprises fibers, the fibers of said strength member are comprised of a plurality of first and second fibers formed of first and second materials, respectively.

26. A fiber optic cable according to claim 19 further comprising a buffer layer tightly surrounding said at least one optical fiber, said buffer layer being surrounded by said strength member.

27. A fiber optic cable according to claim 19 further comprising a buffer tube loosely surrounding said at least one optical fiber, said buffer tube being surrounded by said strength member.

28. A fiber optic cable according to claim 19 further comprising a jacket surrounding said strength member.

29. A fiber optic cable according to claim 28 further comprising at least one ripcord disposed between said strength member and said jacket.

30. A fiber optic cable according to claim 19 wherein said at least one optical fiber extends in a longitudinal direction, and wherein said strength member defines major and minor axes and preferentially bends about said major axis.

31. A fiber optic cable comprising:
    at least one optical fiber;
    a first strength member at least partially surrounding said at least one optical fiber;
    a second strength member at least partially surrounding said first strength member; and
    wherein said first and second strength members are physically distinct from one another and one of said strength members includes fibers.

32. A fiber optic cable according to claim 31 wherein one of the said first and second strength members comprise glass and the other of said first and second strength members comprise aramid.

33. A fiber optic cable according to claim 31 wherein said second strength member comprises a rod defining a longitudinally extending slot, and wherein said first strength member is disposed within the slot defined by the rod of said second strength member.

34. A fiber optic cable according to claim 33 wherein said first strength member also comprises a rod defining a longitudinally extending slot, and wherein said at least one optical fiber is disposed within the slot defined by the rod of said first strength member.

35. A fiber optic cable according to claim 31 further comprising a jacket surrounding said second strength member.

* * * * *